May 13, 1941.  A. J. FUCHS  2,241,849
NONSKID MECHANISM FOR DUAL WHEELS
Filed Feb. 7, 1940   5 Sheets-Sheet 1
Fig. 1.
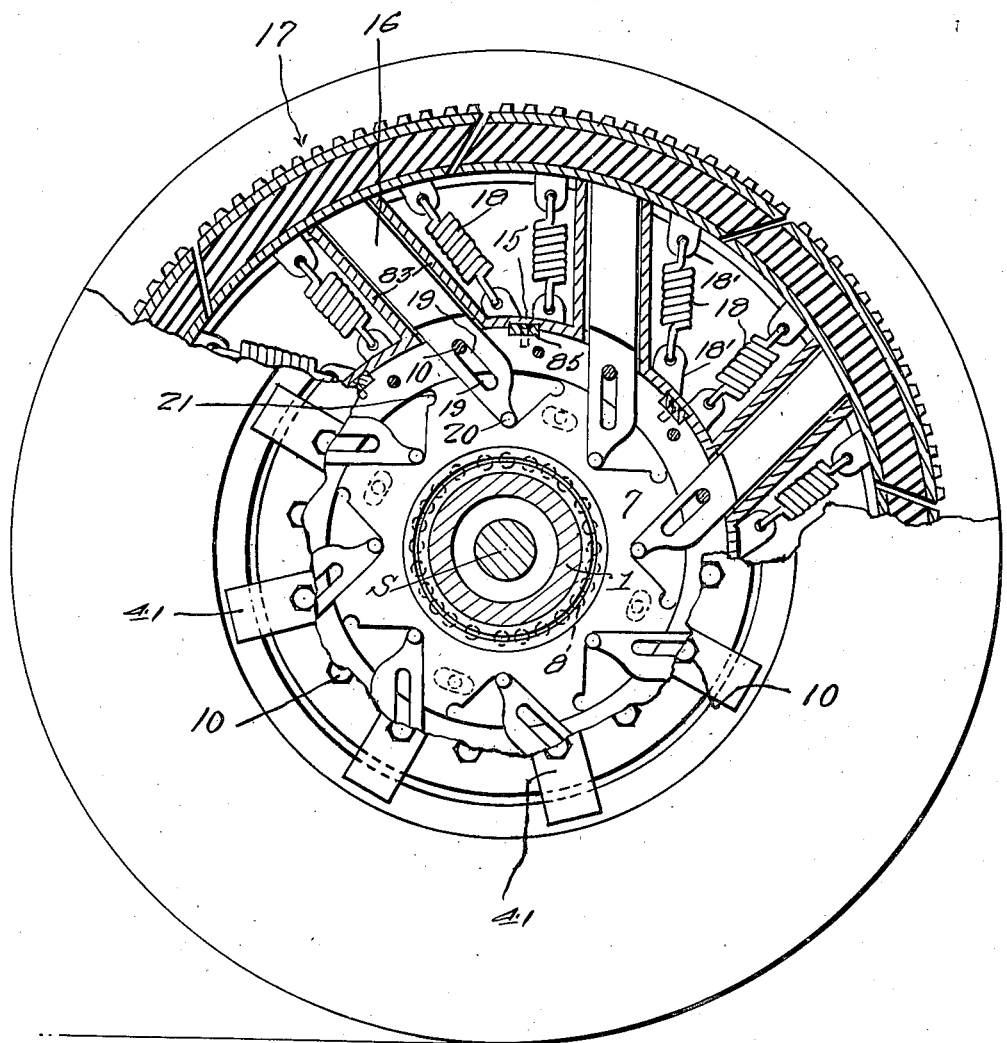
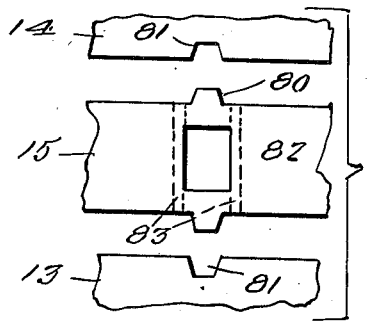
Fig. 9.
Inventor
Arthur J. Fuchs
By Clarence A. O'Brien
and Hyman Berman
Attorneys

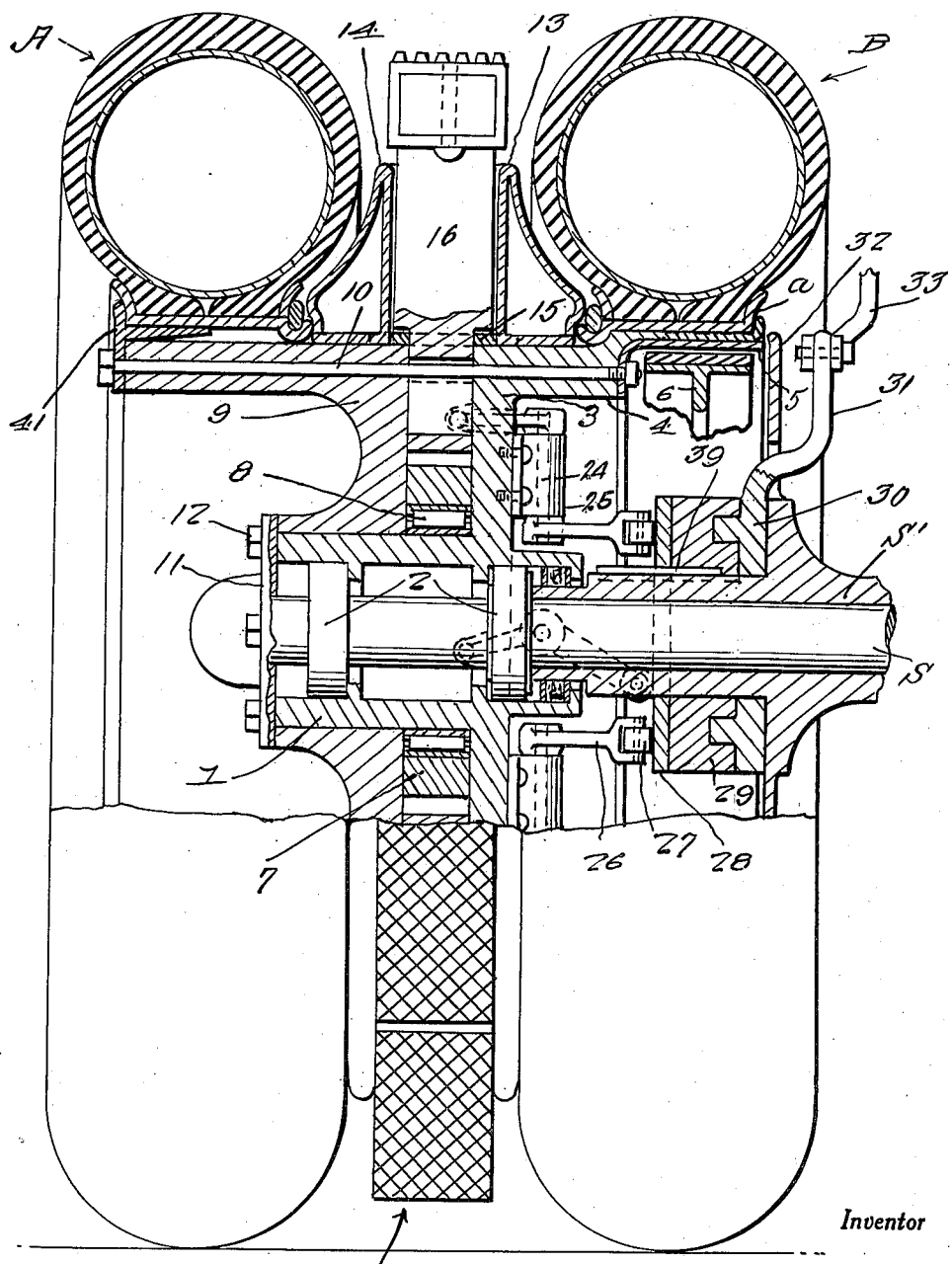

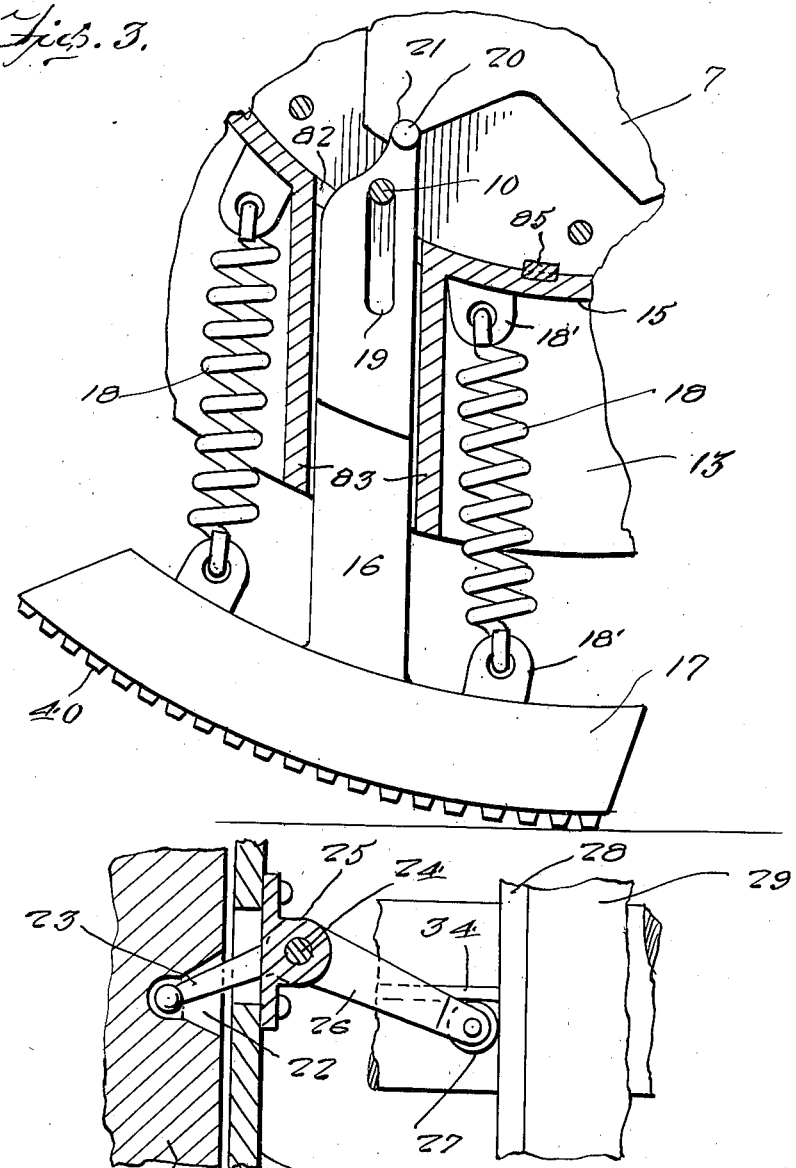

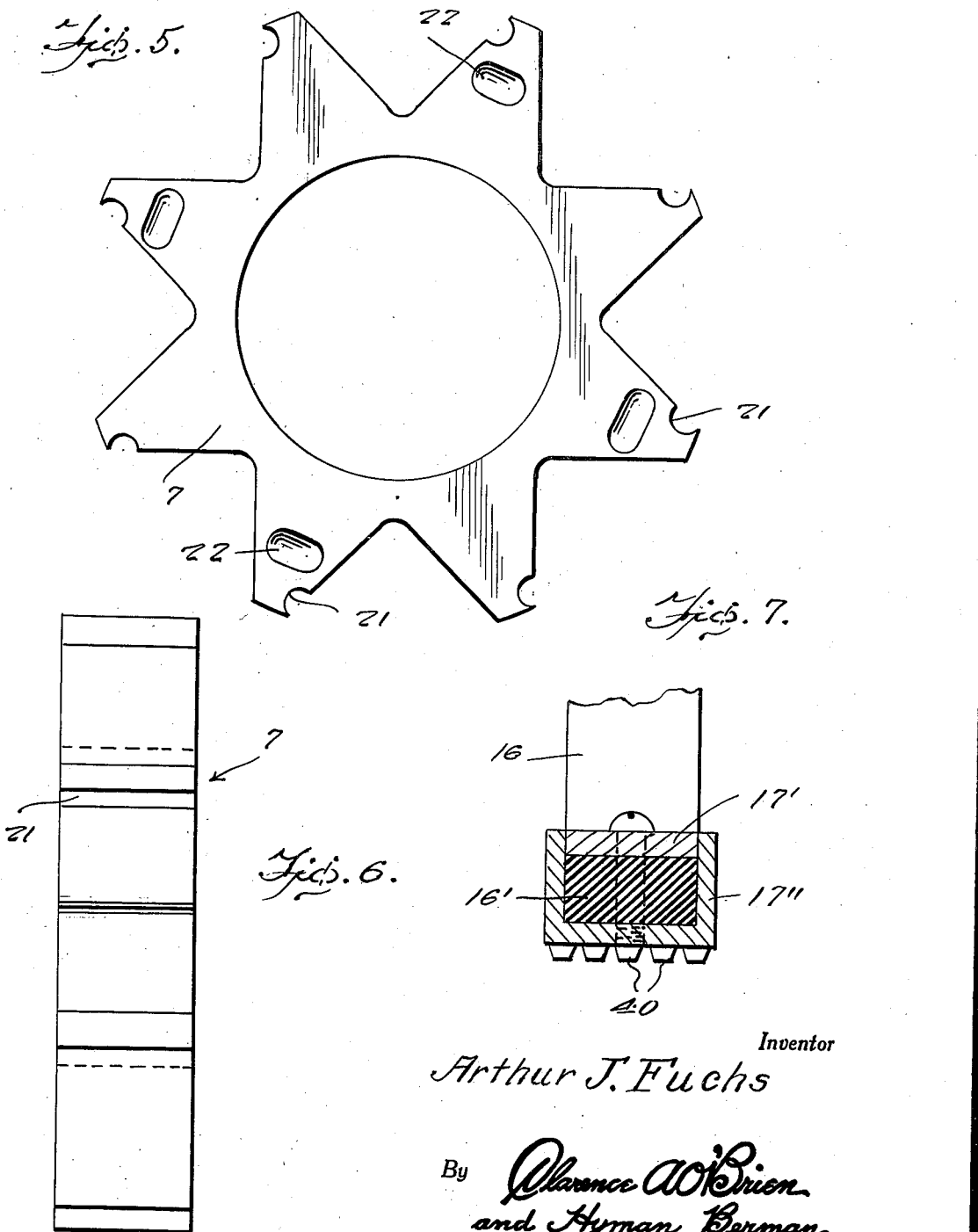

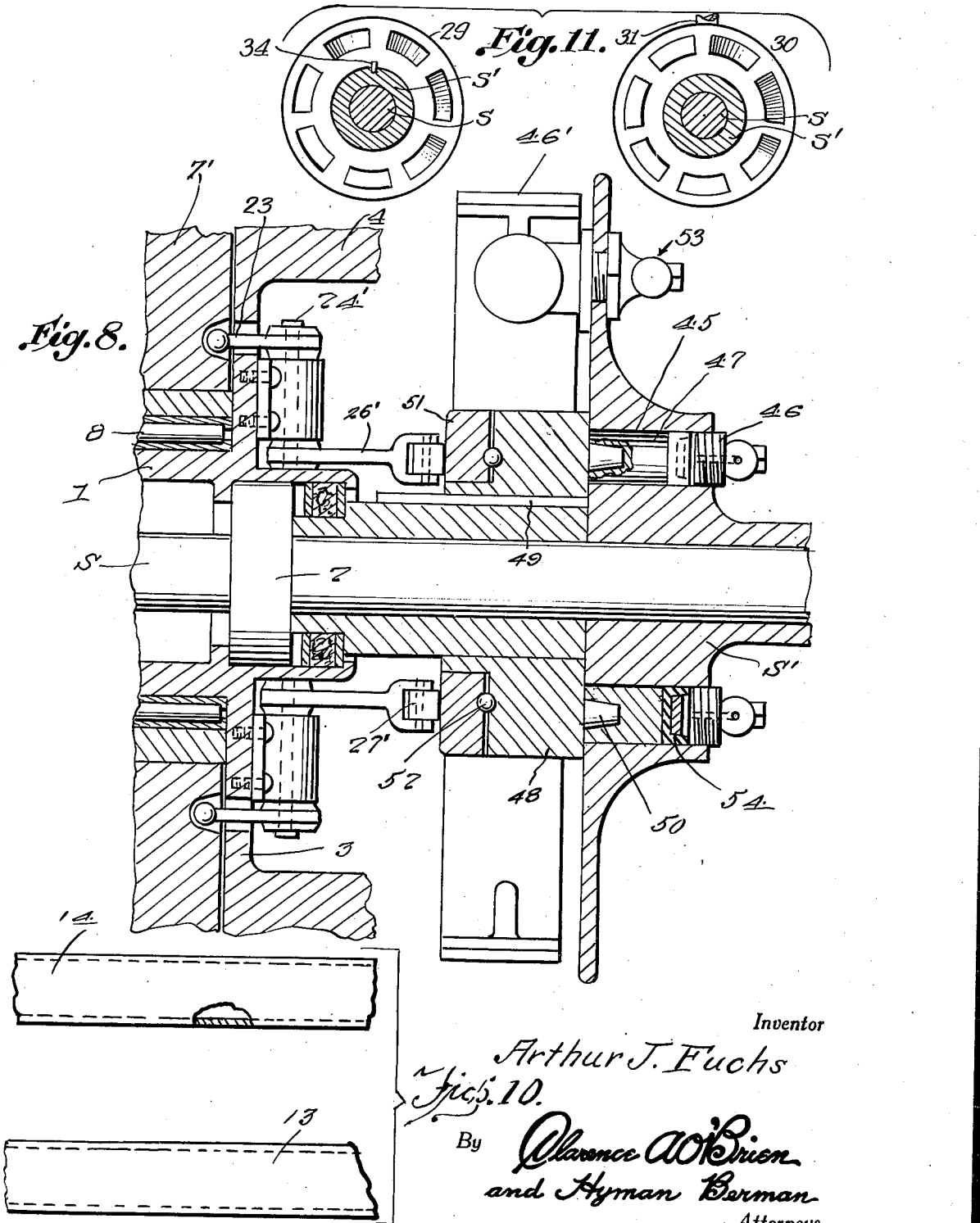

Patented May 13, 1941

2,241,849

UNITED STATES PATENT OFFICE 2,241,849

NONSKID MECHANISM FOR DUAL WHEELS

Arthur J. Fuchs, St. Louis, Mo., assignor of one-third to Arthur S. Kee and one-third to Lester Probst, both of St. Louis, Mo.

Application February 7, 1940, Serial No. 317,749

5 Claims. (Cl. 301—47)

This invention relates to a nonskid mechanism for the dual wheels of a vehicle, the general object of the invention being to provide a sectional circular member located between a pair of wheels and normally of a circumference less than that of the wheels, with manually controlled means for projecting the sections to increase the circumference so that the sections of the circular member will engage the road surface in such a manner as to prevent skidding or slipping of the vehicle.

A further object of the invention is to so construct and arrange the parts that the device will not interfere with the removal or replacement of the tires and rims of the wheel structure.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1 is a face view of the wheel structure with the parts in section.

Figure 2 is a view looking toward the circumferences of a dual wheel structure with parts in section to show the internal arrangement of the invention.

Figure 3 is a fragmentary vertical sectional view showing one of the sections of the antiskid member projecting to engage the road surface.

Figure 4 is a detail view partly in elevation and partly in section showing the shaft and arms for imparting movement to the star wheel from the manually actuated member.

Figure 5 is a face view of the star wheel.

Figure 6 is an edge view of the wheel.

Figure 7 is a detail sectional view through one of the sections of the antiskid member.

Figure 8 is a fragmentary vertical sectional view through a dual wheel structure and showing a modification of the invention.

Figure 9 is a fragmentary plan view of the three ring members located between the inner and outer tire carrying rims and showing the keys for connecting the three ring members together.

Figure 10 is a fragmentary plan view of the two hollow ring members.

Figure 11 is a view looking toward the operative faces of the two cam members.

In the drawings, the letters A and B indicate dual wheels of a vehicle, each wheel including a felly equipped web a tire and its tube and a rim $a$ supported on the felly and these wheels are carried by a hub structure carried by a shaft S of the vehicle, a portion of the axle housing being shown at S'. The tubular part of the hub is shown at 1 and anti-friction bearings 2 are placed between the axle and the hub and a web forming flange 3 extends from the inner end part of the hub and has at its outer circumference an inwardly extending felly or rim 4, a portion of which forms a seat for the tire rim $a$ of the inner wheel B and this rim 4 also carries the brake drum 5 for the inner wheel, the shoe mechanism for which being shown at 6.

A star-shaped wheel 7 is rotatably supported from the hub 1 through means of the anti-friction bearings 8 and said wheel is located between the flange 3 and a ring-shaped felly forming member 9, this member 9 being held on the hub by means of the bolts 10 which pass through the rim 4 and said member 9 is also held in position by the hub cap 11 held in place by the bolts 12. This member 9 is formed with a felly on which is supported the tire assembly of wheel A. Hollow rings 13 and 14 surround the rim 4 and the member 9, each of these rings having a straight inner wall and a curved outer wall with the wide part of the ring contacting the member which it surrounds and these rings leave a space of annular form which forms a widened continuation of the space between the flange 3 and the member 9 and the curved portions of rings 13 and 14 are located adjacent the inner portions of the tires of the wheel parts A and B. A third ring 15 is located between the rings 13 and 14 and this ring 15 bridges the space between the rim 3 and member 9 and has edge portions resting on these parts 3 and 9. The ring 15 is formed with the keys 80 at its side edges for fitting in the notches 81 in the rings 13 and 14, as shown in Figure 9 for preventing relative rotary movement between the three rings and said ring 15 is formed with a plurality of holes 82, each hole being arranged between a pair of outwardly extending plates 83 on the ring 15, these plates forming substantially tangentially arranged passages for the arms 16 to place said arms at a suitable angle to retard the action of centrifugal force on the arms when the wheel is moving at high speed. As will be seen each arm 16 has a wide outer portion fitting between the rings 13 and 14 and between a pair of plates 83 and each arm has a reduced inner portion fitting in the space formed by the rim 3 and the member 9, this reduced portion passes through a hole 82 of ring 15. A segmental shoe 17 is connected to the outer end of each arm, these shoes forming an annular member which constitutes the ground engaging element of the nonskid mechanism. Springs 18 connect the shoes with the ring 15 and these springs are located between the plates 83, as shown in Figure 1, and they connect with ears 18' formed on the ring 15 and the shoes respectively. The ring 15 is held against rotary movement by the key-bars 85 passing through transverse grooves in the inner circumference of the ring 15 and in grooves in the rim 3 and member 9. The inner portions of the arms 16 are provided with the longitudinally extending slots 19 and some of the bolts 10 pass through the slots to limit longitudinal movement of the arms. The inner end of each arm is reduced and formed with a roller-like part 20 for engaging the side edges of the projections or prongs of the wheel 7 so that the rotary movement of this wheel will project the arms and, therefore, the shoes, the springs 18 retracting the parts after the prongs free the inner ends of the arms. Each prong adjacent its outer end is formed with a recess or notch 21 for receiving the part 20 at the inner end of an arm 16 for holding the arm in projecting position when the wheel 7 has been turned to a certain position. The wheel 7 is formed with a number of substantially conical recesses 22 in one face thereof for receiving the rounded ends of arms 23 on shafts 24 journaled in bearings 25 attached to the inner face of the flange 3, a forked arm 26 being connected to the other end of each shaft 24 with the forked end carrying a roller 27 for engaging a thrust plate 28 on a cam member 29 which engages a similar cam member 30 having a crank arm 31 connected therewith which passes through an opening in a backing plate 32 carried by the hub housing S' and actuated from a point adjacent the driver's seat in any suitable manner by a connection 33 attached to the crank arm 31. This member 30 is rotatably arranged on a cylindrical part of the housing S' while the member 29 is held against rotary movement but permitted to have sliding movement on said cylindrical part of the housing through means of the key arrangement 34.

As shown in Figure 2 the springs 18 normally hold the shoes or segmental members 17 retracted with their beveled ends adjacent each other, as shown in Figure 1 and with the outer circumference of the annular member formed by the shoes out of contact with the road surface or with the outer circumference of the member formed by the shoes of a less diameter than that of the wheel members A and B. Thus the shoes will not engage the ground or road surface. However when it is necessary to use the invention to stop the slipping or skidding of the wheel structure the operator actuates the member to which the connecting means 33 are connected so that the arm 31 is caused to partly rotate the member 30, the teeth of which cause the member 29 and the plate 28 to move to the left of Figure 2 which through the arms 26 rock the shafts 24 and cause the arms 23 to partly rotate the wheel 7 so that the projections or prongs of the wheel will move the arms 16 outwardly against the action of the springs 18 until the parts 20 engage the notches 21 and then the shoes are in projected positions so that their outer circumferences will engage the road surface and thus prevent skidding or slipping of the wheel structure.

The shoes may be of any suitable construction but the drawings, particularly Figure 7 shows each shoe as provided with an inner arcuate part 17' to which the arm 16 is connected and a channel part 17" having a sliding fit over the part 17' with a member of rubber or the like located in the channel as shown at 16'. This type of shoe is resilient and the bight of the channel may be provided with the lugs or projections 40 on its outer face.

Lugs 41 are used to hold the rim of the wheel A in place and these lugs are detachably held in place by means of the bolts 10.

By removing the bolts 10 and removing the hub cap 11 the outer wheel A and the ring member 9 can be removed as can also the rings 13, 14 and 15 and the shoes 17 with the arms 16 can be removed so that the ring 13 can be removed and then the tire and the inner ring B can be removed.

Figure 8 shows an arrangement whereby the nonskid mechanism can be operated by hydraulic or pneumatic means and in this case the axle housing S' is formed with the cylinders 45 closed at their outer ends by the plugs 46 to which conduits leading from a suitable source of supply are connected. A piston 47 is arranged in each cylinder and a ring-shaped member 48 surrounds the cylindrical part of the hub housing and is supported for sliding movement thereon by the key means 49 and this member 48 has the projections 50 thereon passing into the cylinders and adapted to be engaged by the pistons, when the pistons are forced outwardly by the introduction of fluid into the cylinders. This will cause the member 48 to move outwardly so that the ring 51 rotatably arranged thereon, by means of the antifriction means 52 will press upon the rollers 27' of the forked arms 26' so as to cause the shafts 24' to rock and thus cause the arms 23' to rotate partially the star-shaped wheel 7'. The other parts of the device are similar to those before described. Also the brake means 46' for the inner wheel structure are actuated by hydraulic or pneumatic means, as shown at 53. Each piston 47 is provided with a cup 54 at its outer end against which the fluid acts.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A dual wheel comprising a hub, a wheel forming flange connected with the hub and having a rim at its outer circumference, a star wheel rotatably arranged on the hub, a wheel forming ring member on the hub and between which and the flange the star wheel is arranged, means for holding the ring member in place, a pair of ring members surrounding the first-mentioned rim and the ring member and spaced apart, a plurality of shoe sections, an arm connected with each section and extending inwardly between the pair of ring members and said arms having their inner ends reduced and rounded to engage the prongs of the star wheel, spring means for normally holding the arms and the shoes in retracted position and means for partly rotating the star wheel to project the arms and the shoes.

2. A dual wheel comprising a hub, a wheel forming flange connected with the hub and having a rim at its outer circumference, a star wheel rotatably arranged on the hub, a wheel forming ring member on the hub and between which and the flange the star wheel is arranged, means for holding the ring member in place, a pair of ring members surrounding the first-mentioned rim and the ring member and spaced apart, a plurality of shoe sections, an arm connected with each section and extending inwardly between the pair of ring members, said arms having their inner ends reduced and rounded to engage the prongs of the star wheel, spring means for normally holding the arms and the shoes in retracted position and means for rotating the star wheel to project the arms and the shoes, each prong of the star wheel having a notch therein for receiving an inner end of an arm to hold the arm in projected position.

3. A dual wheel comprising a hub, a wheel forming flange connected with the hub and having a rim at its outer circumference, a star wheel rotatably arranged on the hub, a wheel forming ring member on the hub and between which and the flange the star wheel is arranged, means for holding the ring member in place, a pair of ring members surrounding the first-mentioned rim and the ring member and spaced apart, a plurality of shoe sections, an arm connected with each section and extending inwardly between the pair of ring members, said arms having their inner ends reduced and rounded to engage the prongs of the star wheel, spring means for normally holding the arms and the shoes in retracted position and means for rotating the star wheel to project the arms and the shoes, each prong of the star wheel having a notch therein for receiving an inner end of an arm to hold the arm in projected position, the means for rotating the star wheel including a number of rock shafts, an arm connected to one end of each shaft and engaging a recess in the star wheel, an arm connected with the other end of each shaft nad having a roller at its outer end and manually controlled means engaging the rollers for moving the roller carrying arms in a direction to rock the shafts.

4. A nonskid device of the class described comprising a hub part, a star wheel rotatably arranged thereon, supporting means having slots therein, arms slidably arranged in the slots and having their inner ends rounded to engage the prongs of the star wheel, shoes connected with the outer ends of the arms for engaging a road surface when the arms are projected, spring means for holding the arms in retracted position, rock shafts, means connected therewith for rotating the star wheel, roller carrying arms attached to the rock shafts for rocking the same, a cam member supported for horizontal movement and engaging the rollers of the roller carrying arms for rocking the shafts, a second cam member supported for rotary movement, and manually controlled means for partly rotating the rotary cam member.

5. In a device of the class described, a hub, inner and outer rim carrying members carried by the hub, means for removably holding the outer member on the hub, a pronged wheel rotatably arranged between the members, said members being spaced apart, a pair of ring-shaped members, one on one rim of one rim carrying member and the other on the rim of the other rim carrying member, a third ring-shaped member surrounding the adjacent portions of the rims and located between the pair of ring-shaped members, keys for connecting the third ring-shaped member with the rims and said third member having holes therein and pairs of plates carried by the third member and extending outwardly, each pair of plates being spaced apart and forming substantially tangentially arranged spaces with each space communicating with a hole in the third plate, arms passing through said spaces and said holes and having their inner ends engaging the pronged wheel, shoes connected with the outer ends of the arms for engaging a road surface when the arms are projected, spring means for holding the arms in retracted position and manually operated means for actuating the pronged wheel first in one direction to project the arms and then in another direction to permit the springs to retract the arms.

ARTHUR J. FUCHS.